US006223170B1

(12) United States Patent
Skovgaard

(10) Patent No.: US 6,223,170 B1
(45) Date of Patent: *Apr. 24, 2001

(54) METHOD AND APPARATUS FOR INFERENCE OF PARTIAL KNOWLEDGE IN INTERACTIVE CONFIGURATION

(75) Inventor: Hans Jorgen Skovgaard, Farum (DK)

(73) Assignee: Baan Development B.V., Barneveld (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,623

(22) Filed: Dec. 29, 1997

(30) Foreign Application Priority Data

Sep. 9, 1997 (DK) .................................................. 1034/97

(51) Int. Cl.[7] .................................................. G06F 17/00
(52) U.S. Cl. .................................. 706/47; 706/46; 706/51
(58) Field of Search .................................. 395/706, 708; 706/45, 47, 48, 46, 51, 59, 53; 364/474; 701/57, 58; 707/103

(56) References Cited

U.S. PATENT DOCUMENTS

| 4,591,983 | * | 5/1986 | Bennett et al. ........................ 706/53 |
| 4,809,170 | * | 2/1989 | Leblang et al. ........................ 717/3 |
| 5,140,671 | | 8/1992 | Hayes .................................... 706/60 |

(List continued on next page.)

FOREIGN PATENT DOCUMENTS

| 0 359 254 A2 | 3/1990 | (EP) . |
| B1 0 456 675 | 11/1991 | (EP) . |
| WO 97/15886 | 5/1997 | (WO) . |

OTHER PUBLICATIONS

Kurlander et al., Inferring constraints form multiple snapshots:, ACM Trans. on Graphics, vol. 12, No. 4, pp 277–304, Oct. 1993.*
Rose et al, "A decision based configuration process model", IEEE, pp 316–325, 1990.*
Mason et al, "Program transformations fro configuring components", ACM pp 297–308, Mar. 1991.*
Kurlander et al, "Inferring constraints from multiple snapshots", ACM Trans. on grahhics, vol. 12, No. 4, pp 277–304, 1990.*

(List continued on next page.)

*Primary Examiner*—Paul R. Lintz
*Assistant Examiner*—Anil Khatri
(74) *Attorney, Agent, or Firm*—Oliff & Berridge, PLC

(57) ABSTRACT

The invention relates to a method of configuring a set of object values in a computer. At least one object value of the set of object values is user-chosen from a number of object values. Each object has at least one possible object value. Each object value is determined or undetermined. Each of the determined object values is assigned to a value. Some or all of these object values is included in the set of object values. The object values are constrained by a rule base defining a number of relationships between the objects or the object values. The method uses at least one interruptable algorithm adapted to deduce knowledge about the undetermined object values. This knowledge indicates whether a user selection of a part of or all of the individual undetermined object values are possible or not. The algorithm(s) includes at least one readout point. In at least one dynamic representation of object values, the deduced knowledge in each readout point represents partial knowledge about the undetermined objects, the partial knowledge being presented to the user in response to a user interrupt or a time interrupt. Thus, the invention improves the interactive performance of configuration because information of knowledge can be gradually extracted.

19 Claims, 15 Drawing Sheets

U.S. PATENT DOCUMENTS

| | | | | |
|---|---|---|---|---|
| 5,402,524 | * | 3/1995 | Bauman et al. | 706/45 |
| 5,428,712 | * | 6/1995 | Elad et al. | 706/46 |
| 5,446,830 | * | 8/1995 | Crawford et al. | 706/51 |
| 5,446,885 | * | 8/1995 | Mooer et al. | 707/103 |
| 5,500,802 | * | 3/1996 | Morris et al. | 364/474.24 |
| 5,515,524 | | 5/1996 | Lynch | 703/13 |
| 5,592,590 | * | 1/1997 | Jolly | 706/59 |
| 5,617,514 | * | 4/1997 | Dolby et al. | 706/45 |
| 5,638,492 | * | 6/1997 | Maeda et al. | 706/45 |
| 5,682,466 | * | 10/1997 | Maeda et al. | 706/46 |
| 5,706,453 | * | 1/1998 | Cheng et al. | 345/347 |
| 5,809,212 | * | 9/1998 | Shasha | 706/46 |
| 5,874,955 | * | 2/1999 | Rogowitz et al. | 345/339 |
| 5,875,285 | * | 2/1999 | Chang | 706/53 |
| 5,946,693 | * | 8/1999 | Mizuyama et al. | 707/103 |
| 5,951,687 | * | 9/1999 | Chan et al. | 713/2 |
| 5,987,473 | * | 11/1999 | Jorgensen et al. | 707/104 |

OTHER PUBLICATIONS

Dhar et al, Rule based versus structure based model for explaing and genearting expert behavior, Comm. of the ACM vo. 30. No. 6, pp 542–555, Jun. 1987.*

Berrada et al, VMCM a PCTE basewd version and configuration management ystem ACM pp 43–52, May 1991.*

Lin et al, "Configuration management with logical structure", Proc. of ICSE, IEEE pp 298–307, 1996.*

Rose et al, A decision based confuguration process model:, IEEE pp 316–325, Jun. 1987.*

*The Journal of Logic Programming*, vol. 19, No. 20, 1994, Tomas Axling et al., "A Tool for Developing Interactive Configuration Applications," pp. 1–22.

Schulte C, "Oz Explorer: A Visual Constraint Programming Tool" Proceedings of the Fourteenth International Conference on Logic Programming, Leuven, Belgium 1997, pp. 286–300 (No. 1–15).

* cited by examiner

| X.0?...X.10? | Y.0?...Y.10? | A.True✓ | B.True? |
|---|---|---|---|
| C.True? | D.True? | E.True? | A.False✗ | B.False? |
| C.False? | D.False? | E.False? | | |

```
X.0? X.1? X.2✗ ... X.10✗        A.True✓    B.True✓

C.True?     D.True?    E.True?   A.False✗   B.False✗

C.False?    D.False?   E.False?  Y.0?...Y.10?
```

X.0? X.1? X.2✗ ... X.10✗    A.True✓    B.True✓

C.True?    D.True?    E.True✓    A.False✗    B.False✗

C.False?    D.False?    E.False✗    Y.0?...Y.10?

Fig. 7b

X.0(✗)X.1(✓)X.2✗...X.10✗    A.True✓    B.True✓

C.True(✗)    D.True(✓)    E.True✓    A.False✗    B.False✗

C.False(✓)    D.False(✗)    E.False✗    Y.0(✗)    Y.1(✗)    Y.2(✗)

Y.3(✓)        Y.4(✗)...Y.10(✗)

```
X.0 ✗  X.1 ✓  X.2 ✗ ... X.10 ✗              A.True ✓       B.True ✓

C.True ☆      D.True ☆      E.True ✓   A.False ✗      B.False ✗

C.False ☆    D.False ☆    E.False ✗   Y.0 ✗    Y.1 ✗      Y.2 ✗

X.0✗  X.1✓  X.2✗ ... X.10✗        A.True✓        B.True✓

C.True☆        D.True☆        E.True✓        A.False✗        B.False✗

C.False☆        D.False☆        E.False✗        Y.0✗        Y.1✗        Y.2✗

METHOD AND APPARATUS FOR INFERENCE OF PARTIAL KNOWLEDGE IN INTERACTIVE CONFIGURATION

CROSS REFERENCES

A reference is made to the following patent applications, filed at the same day as this application and assigned to the same assignee, Beologic A/S:

(1) A Method of Configuring a Set of Objects in a Computer
(2) A Method and Apparatus for Inference of Partial Knowledge in Interactive Configuration
(3) A Method of Processing a Request to a Boolean Rule
(4) Configuration via Network
(5) A Method for enabling invalid choices in interactive configuration systems which are hereby incorporated as references to be understood in connection with the present invention.

BACKGROUND OF THE INVENTION

This invention relates to a method of configuring a set of object values in a computer, at least one object value of said set of object values being user-chosen from a number of object values, each object having at least one possible object value, each object value being determined or undetermined, each of said determined object values each being assigned to a value, some of these or all of these object values being comprised in the said set of object values, and said object values being constrained by a rule base defining a number of relationships between the objects or the object values.

More particularly, this invention relates to the solving of configuration problems by means of a computer acting as a configuration aid for either a salesman or the customer himself. E.g. configuring a car, i.e. choosing a specific combination of engine, paint, accessories, etc. or e.g. configuring a computer system comprising different kinds of CPU's, ports, terminals, communications units, etc. will typically result in a huge and very complicated problem because of a great number of choices to be made and an overwhelming system of constraints between the different elements to be decided on.

A computer system intended to solve a configuration problem is a special application of artificial intelligence where the problem can be stated in terms of a set of selectable elements (e.g. engines, colors . . . ), or in other terms selectable values, and a number of relations (constraints) between these selectable elements (e.g. 4.0 l engine is not possible together with the color of paint light blue).

In the following a selectable element is anything that can be included or excluded in a configuration. It can be a physical object (e.g. a car or a computer system as mentioned), an attribute (e.g. the color red or the texture pattern of a carpet) or something abstract (e.g. a specific number of trips between home and work or a particular type of contracts.

Typically, selections are constrained by previous choices of elements. If for instance a shopper in a supermarket wants only to buy ecological products, he may not be able to buy coffee. Thus, when selecting products, parts or features in a configuration system there should never be any available selections which are in fact invalid. This might seem very easy but is in fact one of the main difficulties in interactive configuration systems, as will be understood more fully from the following description.

The shopper from before could choose not to buy only ecological products. He may also choose not to buy coffee even if it is available. It is therefore desirable at any time to have a dynamic display of key figures, descriptions, graphics and video which change according to the customer's current focus and history.

An interactive computer configuration system is an aid for the salesman or the customer to make it just as easy to grasp and configure a huge problem as it is for a customer in the supermarket to know himself that he has bought exactly what he needs to treat his dinner guests according to his own decisions and the expectations of the guests.

PRIOR ART

Prior art systems only solve the configuration problem to some extent. Many prior art configuration systems are batch mode systems which are completely out of interest. Only interactive systems are of interest, but the known systems have the disadvantage that the successive selection or discarding of elements often turns out to be a dead-end, because the choices successively made by the user suddenly turn out to be an invalid configuration.

The basic problem of interactive configuration is that the algorithms needed to support a true interactive environment are extremely time-consuming, as the time increases exponentially as a function of object values. This problem is called the NP-hard problem, which has restricted the possible obtainable results related to configuration.

The NP-hard problem affects two very important features related to configuration. First of all, it should be realized that a NP-hard problem affects the time complexity of the involved algorithms. This means that the necessary processing time becomes unacceptable in relation to configuration models or rule bases comprising many object values and many constraints between these. Secondly, dealing with the above-mentioned problems related to processing time, the configuration will have to be reduced in such a way that the configuration problems are reduced to be polynomial. Due to these facts, the prior art has focused on modified configuration models, i.e. rule bases, and modified algorithms. These modified configuration models imply bad structures of the configuration models, and the configuration models are usually not capable of being separately validated.

Three of the most used modifications related to the configuration model are

1. Establishing a certain search order in a decision-tree. This leads to very restricted facilities for the user.
2. Avoiding inference on partial information. This leads to the use of the well known batch mode configuration systems.
3. Establishing the rule base or configuration model in a conditional IF-THEN programming.

All of the previously mentioned techniques have the disadvantage of a very complicated modeling, as the models in attempting to deal with the NP-hard problem, becomes very intrigue. This drawback is somewhat critical, as the generation and maintenance of configuration models of the above mentioned types tends to be very time consuming. It should be noted that the maintenance of a configuration model is one of the most critical and expensive parameters to companies who needs an almost daily modification of the configuration model.

THE INVENTION

This invention relates to a method of configuring a set of object values in a computer, at least one object value of said set of object values being user-chosen from a number of object values, each object having at least one possible object value, each object value being determined or undetermined, each of said determined object values being assigned to a value, some of these or all of these object values being comprised in the said set of object values, and said object values being constrained by a rule base defining a number of relationships between the objects or the object values.

When the method further comprises at least one interruptable algorithm adapted to deduce knowledge about the undetermined object values, said knowledge indicating whether a user selection of a part of or all of the individual undetermined object values are possible or not, said algorithm or algorithms comprising at least one readout point in at least one readout point storing the deduced knowledge in at least one dynamic representation of object values, the deduced knowledge in each readout point representing partial knowledge about the undetermined objects, said partial knowledge being presented to the user in response to a user interrupt or a time interrupt, it is made possible to achieve a prediction of whether a following configuration will have a chance of success.

According to the invention, this prediction can be supplemented by a further active guidance to the user in the sense that information about the possible user selections can be presented to the user before these are actually selected. This feature is a very important aspect related to an interactive communication with the user.

Another and very important aspect of the invention is that it deals with a NP-hard problem. It is thus possible according to the invention to use algorithms capable of being interrupted if no final result can be given within a reasonable time.

The teaching according to the invention is thus that the user will have a possibility of achieving complete response, and that a partial result can be given within a given time limit or user given limit. The empirical experiences of configuration processing are that the number of possible conflicts are increased, depending on how many object values have been previously assigned. Moreover, it should be realized that an NP-hard problem by nature decreases exponentially or non-polynomially, when further object values are assigned. The possibility of gaining full and sufficient knowledge about the undetermined objects values increases according to the number of choices the user have made. Thus the user can be provided with the gained knowledge when it is most needed. The other way round, it should be realized that user is not critically dependent on the knowledge gained by the algorithm in the beginning of the configuration as it is experienced that a user tends to make few invalid choices in the beginning of a configuration. By accepting algorithms having the above state NP-hard problem it has thus shown, that a configuration can proceed smoothly even though full knowledge is not obtained in the beginning of an ongoing configuration, and it has furthermore been shown, that the user will gain more knowledge the closer the configuration comes to an end.

A further important aspect of the invention related to the above mentioned teaching is that the invention, by dealing with a NP-hard problem, offers much more simple and "natural" configuration models. It has thus by empirical experiences been shown, that the modeling time for the same kind of problems, can be reduced by up to a factor 20 or oven more.

Moreover, it is much easier to modify configuration models dealing with a NP-hard problem since no meta-knowledge has been added to adapt the problem to polynomial algorithms. This features is extremely important in relation to fast changing configuration models. Such model can e.g. be configuration models of computers, cars etc.

Another aspect of the invention is that it deals with the problems arising due to sometimes very complicated constraints defined in the rule base and a considerable time consumption needed for carrying out the above-mentioned predictions.

A further aspect of the invention is that the user is presented with partial knowledge which may not necessarily represent the true aspects about the undetermined values and objects.

This means that the configuration method takes a kind of calculated risk by presenting possible incomplete or false information to the user, and as such taking, the risk that the user may select values which may in fact be determined to be false. The invention is thus a kind of compromise between a wish to give the user complete information about future possible selections in a configuration, and a wish to obtain a reasonably short calculation time. It has thus found that the method according to the invention offers a user a very high level of comfort compared to the two possible extremes, namely a very long response time due to the complexity of configuration problems or no indication of whether a following configuration may be going in the right direction and succeed.

Empirical experience, however, has proven that the user actually prefers to be presented with partial knowledge, rather than being trapped in a kind of endless loop.

In many applications according to the invention, the partial knowledge will be presented as complete knowledge in the sense that the uncertainty of the knowledge will be hidden from the user. In other applications, an indication of partial knowledge may be given to the user according to the invention.

In its generic representation, the rule base may be a list of rules representing the relationships between the object values. In many applications the rule base may rather be a list of rules representing the relationships between the object values supplemented with an organizing of the objects or object values on a higher level. The object values may thus be organized in a hierarchy defining relationships between the objects. These relationships may also be a sub-organizing of the rules in such a way that a rule consultation in the rule base may be conditionally depending on a prehistory of the objects or object values. Another example could be that the objects are organized in such a way that the objects define the access to the rule consultations in some objects.

It is thus to be understood that the rule base may be organized straightforwardly or in a more or less complicated structure and substructures.

When presenting the partial knowledge to the user on request of the user, it is possible for the user to terminate a never-ending calculation by a "manually" activated interrupt in the sense that the said partial knowledge is only presented to the user upon a user request. It should be noted that the calculations of the algorithm or algorithms may proceed hidden from the user.

When presenting partial knowledge to the user by at least one predefined or user-defined time interrupt, an advantageous user interface is achieved in the sense that the user will have the possibility of obtaining information, even though the information is not yet sufficient to ensure that coming assignments made by the user may actually be valid. By presenting the partial knowledge to the user after a certain time period, i.e. the length of the time interrupt or interrupts, it is possible to "calibrate" the system to present knowledge to the user with a delay that is tolerable for the user. This tolerated time delay, i.e. the time interrupt, may be programmed by the user, or it can be a default value determined by empirical experience.

If a time interrupt interrupts the algorithm or algorithms, the user will preferably be presented with the representation stored at the last readout point. Other and more algorithm-oriented approaches may very well be conceivable.

When at least one of the said algorithms comprises a temporary assignment of the undetermined object values, and when searching for at least one subset of object values for every temporarily assigned object value, each temporarily assigned value and a subset of determined objects defining a possible configuration of object values satisfying the rule base, said deduced knowledge about the undetermined object values being successively stored in said dynamic representation, it is ensured that the user will successively gain an increased knowledge about the undetermined object values. This increased knowledge can represent different characters of the ongoing configuration Basically, the user should of course be provided with a sufficient knowledge about every selectable object value. As this sufficient knowledge is not always obtainable at the finger tip, the search algorithm may be adapted to search for certain kinds of possible configurations before the final search for all the necessary possible configurations is initiated.

If such search strategy is implemented, it is very important to select rational read-out points, thus ensuring that some of the knowledge can actually be read-out before the interruptable algorithms or routines are interrupted.

An example of a reasonable read point would be a read-out point after each possible configuration found.

It is to be noted that especially the first possible configuration found will give the user a certain kind of knowledge about the proceeding configuration, namely that the already selected or deduced object values can be combined with some of the undetermined object values to a final valid configuration. This prediction is very valuable to the user as the already assigned values may thus be maintained without heading against a dead end of the configuration. This valuable information thus "only" involves one search and validation.

Further guidelines of the search algorithm can be implemented. A search algorithm can thus check whether the objects comprise bound or unbound object values.

When the search for further subsets is randomized in such a way that the order of the temporarily assigned values is random, the knowledge is increased faster than the knowledge obtained by a canonical search in the undetermined object values, as the item of information gained by "random" possible configurations differs mutually more than ordered possible configurations. The more differing object values found, the better.

When a register of the temporarily assigned object values is modified when one or more temporarily assigned object values are comprised in a found further subset of object values in such a way that further searches are reduced correspondingly, it is ensured that the gained information about the object values found to be a part of a possible configuration, will actually be utilized, as the need for further searches is reduced very fast.

Further, the invention relates to a computer readable medium encoded with a program for performing the method as described above.

BRIEF DESCRIPTION OF THE DRAWINGS

FIGS. 5 to 10 illustrate an evaluated example of the operation of an embodiment of the invention

Referring now to FIG. 1 an introduction to the basic element of the invention will be given.

FIG. 1 thus represents a total quantity of possible object values. The object values can be related to numerous different kinds of definitions or entities, all represented in a quantity 10 of object values 11. Each object value may e.g. represent a discrete entity, a color, a type, a physical property, etc. In FIG. 1 no aspect related to constraints or relationships between the object values have been shown, but it is to be understood that these relationships, e.g. groupings, object definitions, etc. nevertheless restrict the object values.

For illustrative purpose it should be mentioned that the examples given in the following only operate with a very simple ordering of the object values, as an object is expressed to comprise a number of object values. A color may thus be an object, and the specific colors, e.g. red, green and blue, may be object values. It is to be understood that the object values may be ordered in much more complicated structures, if necessary.

Figure 1:
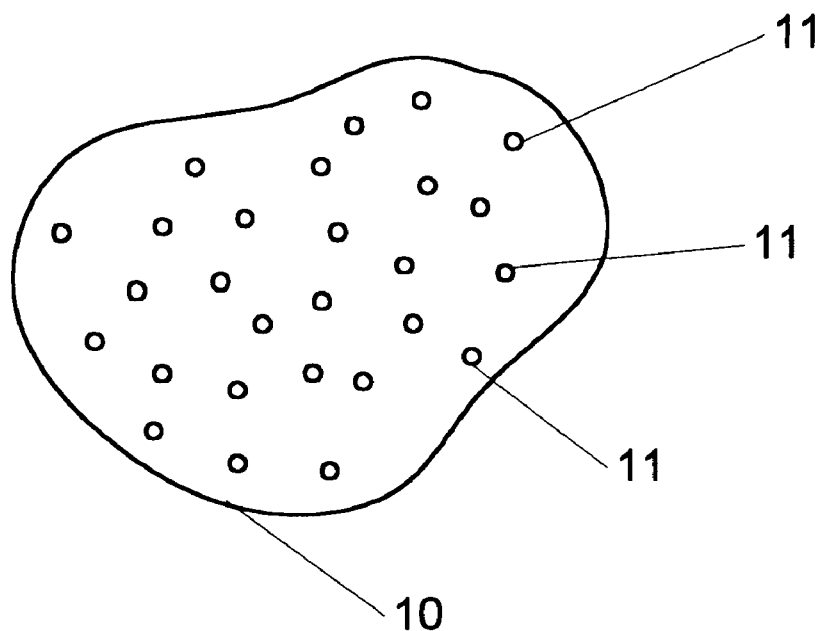
FIGS. 1 to 3 illustrate the basic principle of the invention.
Figure 2:
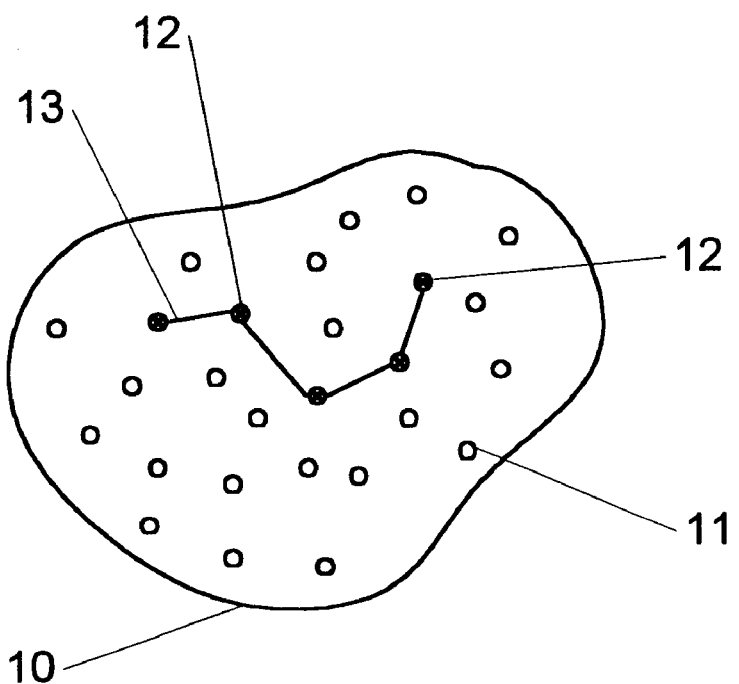

Now referring to FIG. 2, some of the object values have been assigned to be comprised in a partial configuration 13, indicated as configured object values 12. This partial configuration represents a configuration, having not yet been completed, the partial configuration being a combination of some of the configured object values 12. If the example relates to a car, the chosen object values may e.g. be a color, an engine, a sunroof, a certain tire type, a price or other possible options.

As will appear, it is evident that the user's effort in making a final configuration may be somewhat difficult, as the underlying constraints are widely hidden to the user. The closer the configuration comes to an end, the more difficult the next selection will be, as the remaining object values will tend to be more and more restricted.

In the effort to provide the user with possible guidance during the whole configuration process of object values, one by one, choice by choice, the environment should be supported by a more user-oriented presentation.

Figure 3:
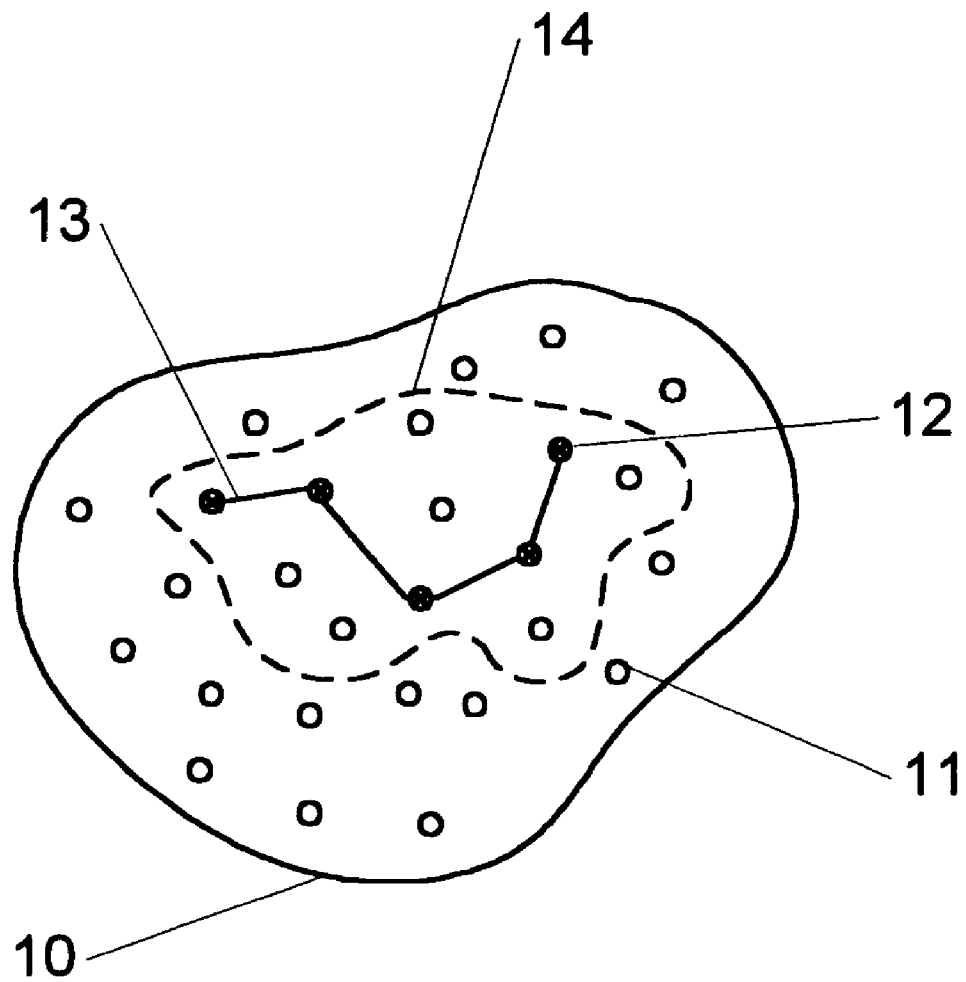

Now referring to FIG. 3, the basic concept of the invention is illustrated. The user has now made the partial configuration 13, and the next user choice is to be made.

The basic concept of the invention is now to give the user all the information he will need to choose a valid object value and put all into the partial configuration every time a choice is made. This can be done by excluding the next object values of the remaining object values which can not be comprised in a valid final configuration. According to FIG. 3 this is illustrated by the dotted line 14 representing the possible or valid space, now decreasing the number of the next possible choices. Some of the information given to the user may be evident to the user and some of the information given by the illustrated valid space may be of great importance.

It will thus be evident to the user that other possible colors of a car configuration may invalid, if a color has already been chosen, and put into the partial configuration. Nevertheless many other constraints may be impenetrable, and the decreased illustrated valid space 14 may be of the greatest importance for the user.

It is to be stressed that the information provided to the user ought to be given to the user continuously.

One of the reasons why these aspects have been a little overlooked in the prior art, is that the calculation power of modern computers is not big enough to deal with complicated and complex configuration models. Moreover it is extremely difficult to program the constraints into a configuration model which can be validated and maintained.

According to the invention the above-mentioned information is provided by a careful examination of the undetermined object values. This examination will be discussed further in the examples below.

Figure 4:
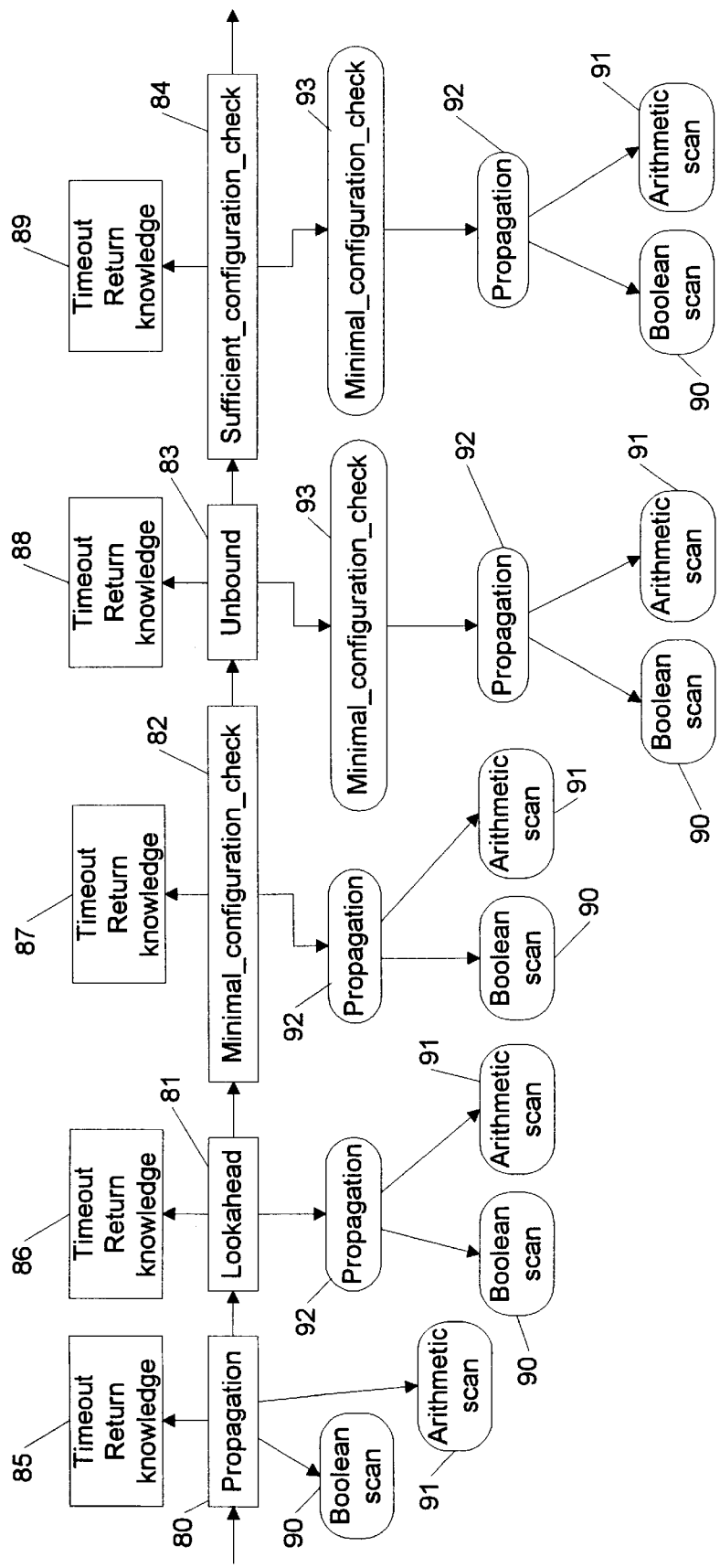
FIG. 4 illustrates the overall principal operations of the method according to the invention.

Referring now to FIG. 4, an overview of a preferred embodiment of the invention will be illustrated.

FIG. 4 thus illustrates a cascade of algorithms adapted to deliver the necessary information and guidance to a user during a configuration process. The algorithms will be further illustrated in the following description.

The basic line of algorithms is thus a Propagation algorithm 80, a LookAhead algorithm 81, a Minimal_Configuration_Check, an Unbound algorithm 83 and a Sufficient_Configuration_Check algorithm 84.

Every algorithm 80, 81, 82, 83 and 84 in the cascade is thus adapted to provide a degree of knowledge which can be made available to the user and also increase the overall performance of the algorithms. Some few results or deductions made by one algorithm in the beginning of the cascade of algorithms will reduce the size of the problem which will have to be dealt with by the following more time-consuming algorithms. This is a particularly important aspect, remembering that the invention is preferably meant to deal with problems which are NP-complete.

Moreover the algorithms are ordered in such a way that the time complexity increases.

Every algorithm can be timer or user interrupt in the steps 85, 86, 87, 88 and 89, respectively. The interrupts will return the summarized knowledge gained at this stage regarding deduced information and validation.

Moreover the algorithms 80, 81, 82, 83 and 84 will call underlying algorithms.

The Propagation algorithm 81 will thus comprise a scanning of a boolean and an arithmetic representation of the rule base representing the organization and constraint of the object values involved. This scanning is implemented in Boolean Scan 90 and Arithmetic Scan 91, respectively. The propagation will examine whether or not a choice, or a partial configuration is valid.

The LookAhead algorithm 81 examines the undetermined space of object values. Every possible next chosen object value will be temporarily assigned, one by one, and the temporary partial configuration may be validated or excluded from the space of next possible object values. For every temporarily assigned value, the Propagation algorithm 92 will be initiated.

The Minimal_Configuration_Algorithm examines whether or not the already assigned partial configuration can be combined with any of the undetermined object values to a valid final configuration. This examination is carried out by searching for a temporary object value, adding this to the partial configuration, calling the Propagation algorithm 92, until at least one valid possible configuration has been found. As will appear, the Minimal_Configuration_Algorithm is very time-complex.

The Unbound algorithm 84 examines whether or not individual objects can be determined to be unbound, i.e. the object comprises at least two unbound object values. This is examined by temporarily assigned object values of objects, until at least two possible configurations have been found. The Unbound algorithm calls the algorithm Minimal_Configuration_Algorithm every time a new possible configuration is to be determined.

The last algorithm, Sufficient_Configuration_Algorithm 84, in the cascade is adapted to gain the sufficient knowledge. This knowledge is obtained by temporarily assigning every undetermined object value, searching for at least one possible configuration comprising the said temporarily assigned value. If such possible configuration can be found, it is now deduced that the temporarily assigned object value is a valid next choice, and, if not, it is now deduced that the temporarily assigned object value is not a valid next choice.

This information may be provided to the user

The Sufficient_Configuration_Algorithm 84 calls the algorithm Minimal_Configuration_Algorithm 82 every time a new possible configuration is to be determined.

If a time-out or a user interrupt appears before the Sufficient_Configuration_Algorithm is completed, the gained knowledge will be presented, taking the risk that the knowledge presented is not sufficient.

Referring now to FIGS. 5 to 10, a further method of the invention will be described. According to a preferred embodiment of the invention, the above-mentioned cascade may comprise five algorithms: Propagation, LookAhead, Minimal_Configuration_Check, Unbound and Sufficient_Configuration_Check. The example will be given on the basis of a system consisting of five single objects A, B, C, D, E and two finite domain objects X,Y with the range of 0 to 10. The rule base consists of the following simple rules:

Rule 1 A→B
Rule 2 B→C or D
Rule 3 C or D→E
Rule 4 X*100+Y*10==C*50+D*40+90

The rule base further comprises rules defining the objects A, B, C, D and E to be a single, i.e. the objects are bound to be exclusively TRUE or exclusively FALSE in a possible configuration.

Furthermore, the objects X and Y are defined to be of the object type ENUM and can take one and only one of the values in the domains of X and Y, respectively.

At the beginning of the configuration all the object values are undetermined.

An input is fed to the above rule base by assigning A to be TRUE as a user selection. The input of this object value immediately reduces the undetermined values to be all the object values except A=FALSE and A=TRUE, which are added to a configuration set of values.

Referring to FIGS. 5a and 5b, the initially chosen object values are shown in basically two different ways. It is to be noted that FIGS. 5a and 5b are just two ways of illustrating the same result, in the sense that FIG. 5a shows the result by means of a diagram of the object values, while FIG. 5b shows the same result by means of a discrete sum representation of the object values.

The chosen representation in the FIGS. 5b to 10b introduces a terminology about the knowledge gained concerning the objects values. This representation will be described briefly by means of the hierarchy shown in FIG. 16.

Knowledge terminology. Each object value is associated with a knowledge value ✓, (✓), ✗ or (✗) indicating if an object must, may, must not or may not take this value. Moreover, if it is unknown whether a value may or may not take a value, this is indicated by the knowledge value ?, and if a value both may and may not be taken, this is indicated by the knowledge value ☆.

These terms can be summarized in the following table 1.

| Action and symbol | |
| --- | --- |
| Concluded/Selected | ✓ |
| Unbound | ☆ |
| Rejected/Discarded | ✗ |
| Possibly concluded | (✓) |
| Possibly rejected | (✗) |
| Unknown | ? |

Table 1

Figure 16:
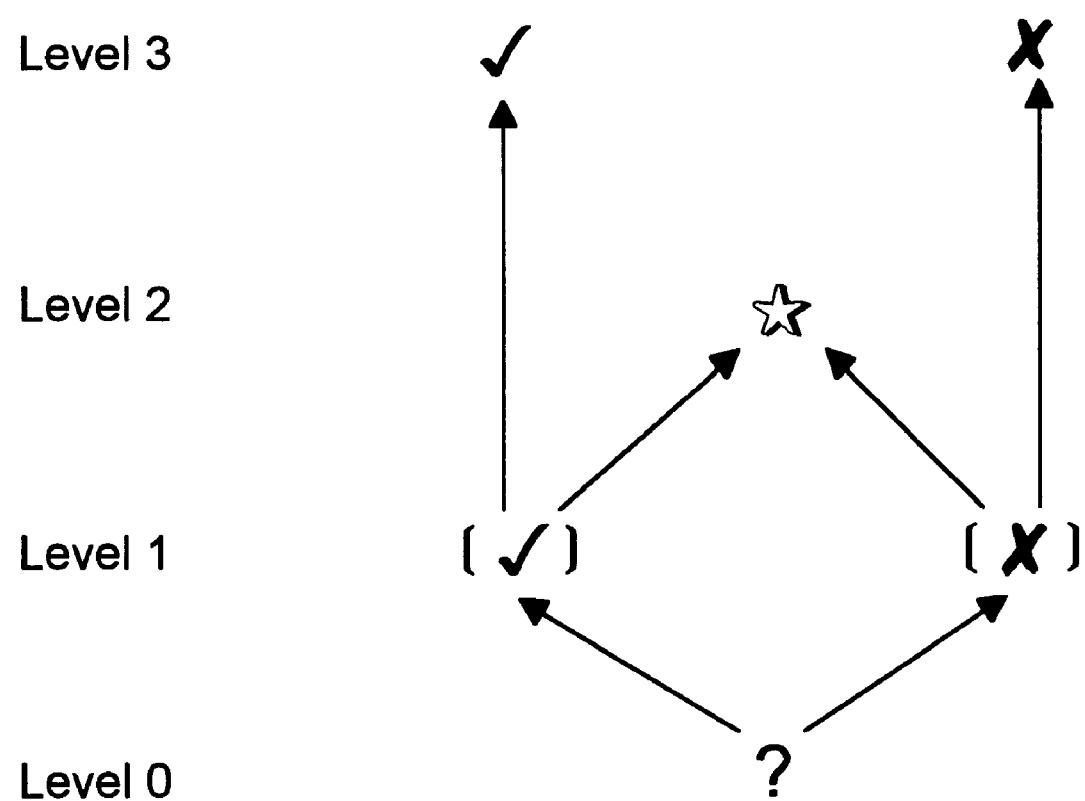
FIG. 16 illustrates an example of knowledge terms according to the invention.

These six knowledge values constitute a partial ordering in three levels illustrated in FIG. 16.

Level 0 in FIG. 16 illustrates that if an object may or may not take a value, the value is said to be unknown and indicated by the knowledge value ?.

Level 1 in FIG. 16 illustrates that if an object may take a value, the value is possibly concluded and indicated by the knowledge value (✓). Further, if an object may not take a value, it is possibly rejected and indicated by the knowledge value (✗). Note that if a value is possibly concluded, it cannot be rejected, and moreover if a value is possibly rejected, it cannot be concluded.

Level 2 in FIG. 16 illustrates that an object both can and may take the value. At this level the object value is said to be unbound and indicated by the knowledge value ☆.

Level 3 in FIG. 16 illustrates that if an object must take a value, it is concluded or selected and indicated by the knowledge value ✓. Further, if an object must not take a value, it is rejected or discarded and indicated by the knowledge value ✗. The terminology uses the words selected or discarded whenever the selection is determined by a user. If the selection is a result of a deduction, the value is said to be concluded or rejected.

It is to be noted that the chosen terminology uses the word unbound both for objects and values of objects. An object is said to be unbound if at least one of its values are unbound. Hence, two object values and not one must be unbound.

It should also be noted that the representation described above is only chosen for illustrative purposes to make a specific illustration of the invention. Many other representations could be chosen to illustrate the invention.

FIG. 5a to FIG. 10a represent the gained knowledge after every algorithm. A / or O indicates that the value has been determined and reached level 3, a dotted / or O indicates that the value has reached level 1, and □ indicates that the value has reached knowledge level 2.

Now returning to FIG. 5b, the user selection is initiated by assigning A to be TRUE, the value of A will be the input value of the above-mentioned first algorithm called propagation.

Propagation

The propagation will, on the basis of the value A=TRUE and the rule base, deduce information about the undetermined object values. The result of this propagation algorithm is shown in FIGS. 6a and 6b.

As shown by FIGS. 6a and 6b, it is now deduced that B must be TRUE, and B is thus assigned to be true. This deduction can be made intuitively by consulting the above cited rule 1. According to the invention, this positive assignment is made possible by deduction and is termed to be a concluded object value.

Furthermore, the propagation deduces that the object values of the object X which satisfy the rule base are limited to be X=0 or X=1. More specifically, in terms of the invention, the values [2:10] are deduced to be excluded from possible assignment. The object values are thus defined to be rejected.

The result of the Propagation algorithm can thus be expressed as

Assignment list: A=TRUE , B=TRUE

Lookahead

The following algorithm, LookAhead, in the algorithm cascade is a very simple algorithm which, by means of a kind of crash test, temporarily picks out all the undetermined object values, or at least a part of them, combining these undetermined values one by one with the previously assigned object values, and testing whether these values combined with the already assigned values actually satisfy the rule base. This test is carried out for every undetermined object value by means of the propagation algorithm.

If the result of the test shows that it is in fact not possible to combine some of the undetermined object values with the previously assigned values, i.e. A=B=TRUE, the undetermined objects will be excluded from the possible object values of the configuration.

The number of necessary propagations in LookAhead according to the example of the invention is nineteen, e.g. eight times TRUE/FALSE of C,D and E plus eleven times the domain of Y.

The result of the LookAhead algorithm is shown in FIGS. 7a and 7b.

In this example the LookAhead algorithm indicates that E must be TRUE, the result being deduced by the fact that E=FALSE turned out to be an impossible configuration object value combined with the previously assigned values A=B=TRUE. This deduction can intuitively be read out of the combination of rules 2 and 3.

The assignment of E=TRUE is due to the above-mentioned terminology concluded to be TRUE, and the partial knowledge is thus updated to be as follows:

The result of the LookAhead algorithm can thus be expressed as

Assignment list: A=TRUE , B=TRUE, E=TRUE

It should to be noted that as yet there is no guarantee that a complete configuration can actually be found, as it is actually not yet verified whether the concluded value of E actually fits into an end configuration.

It should also be noted that the LookAhead algorithm could be cascaded with further algorithms of the same type taking one or more temporary choices.

Minimal_Configuration_Check

The next algorithm in the cascade is the algorithm Minimal_Configuration_Check. This algorithm is more complex than the previous algorithms in the sense that the algorithm has exponential time complexity.

The goal to be achieved by means of this algorithm is quite different compared to the previous algorithms. The goal is thus to ensure that the running configuration is not heading towards a configuration island, or, in other words, a dead end. By the term 'configuration island' in this instance is meant that no combination of the undetermined object values and the previously assigned values satisfies the rule base.

The Minimal_Configuration_Check algorithm is thus capable of detecting whether the proceeding configuration should be terminated. An indication of this will be very valuable in most user environments in the sense that most configurations in real life often turn out to comprise a large amount of assignments. It would thus be extremely inconvenient to the user to experience that a ongoing configuration would be terminated shortly before all the required items were brought into the configuration.

If there at a minimum exists one possible final possible configuration, the Minimal_Configuration_Check is thus meant to give a prediction whether at least one configuration is possible before further assignments are made It should be noted that an exclusive use of the LookAhead algorithm, step by step, in a configuration method would often lead the user into dead ends which are not discovered until the end of the attempted configuration. The Minimal_Configuration_Check will ensure that a dead end, which is not uncovered by the LookAhead algorithm, will be discovered very early in the configuration.

An alternative to the above-mentioned termination of the ongoing configuration if a possible configuration could not be found, would be to let the algorithm environment of Minimal_Configuration_Check be a way of back-tracking the previous assignments when a dead end is discovered.

Figures 8A, 8B:
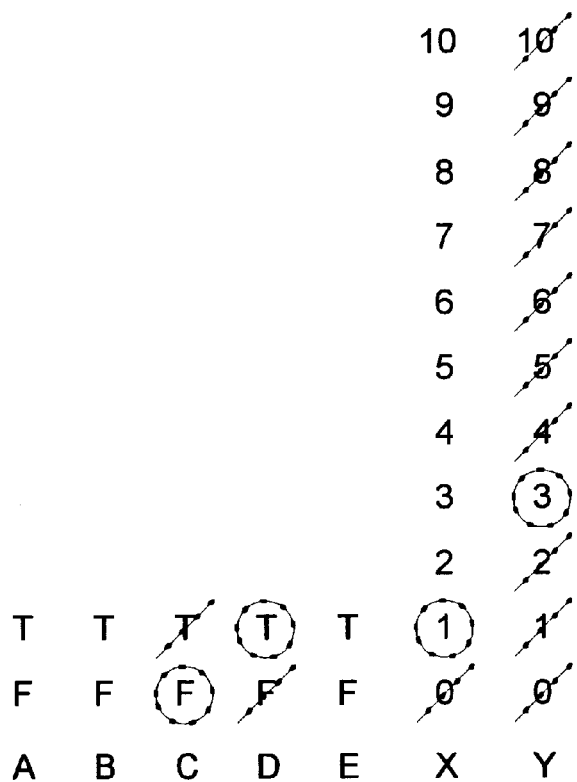

FIGS. 8a and 8b illustrate the result of the algorithm.

The Minimal_Configuration_Check algorithm searches for at least one possible configuration which is usually hidden from the user. According to the preferred embodiment of the invention the possible configuration will be stored for use in the following algorithms. This aspect will be discussed in more detail later in the description.

The one found possible configuration according to this example is the set of A=B=D=E=TRUE, C=FALSE, X=1 and Y=3. The found configuration is shown in FIG. 8a, while FIG. 8b shows the sum of knowledge gained at this stage of the algorithms. It should be stressed that other possible solutions could be found depending on the search strategy.

FIG. 8b expresses the found configuration and the higher level of knowledge in the following way.

As X=1 was found to be comprised in a possible configuration, X=1 is said to be possibly concluded. This means, referring to the terms presented in FIG. 16, that the knowledge about the object value X=1 has increased from level 0 to level 1. Thus, it is now known that any further deduced information will never result in rejection of X=1. A rejection would result in a contradiction, as X=1 has already been shown to be TRUE in the possible solution found. There are only two possible categories left, namely concluded or unbound.

As X=1 is now possibly concluded, it is furthermore deduced that X=0 is possibly rejected.

In the same way the other object values of the possible configuration is said to be respectively possibly concluded, i.e. C=D=TRUE and Y=3 said to be possibly rejected.

Another and very important aspect of the found possible configuration is that the found configuration indicates that the previous assigned object values, i.e. A=TRUE, B=TRUE, E=TRUE, can actually be combined with some of the undetermined object values to satisfy the rule base. It is not crucial that the one found possible configuration is presented to the user, but the user should be blocked with respect to further user assignments if no possible configuration could be found, as the absence of a possible configuration would cause further activity in the same direction to be meaningless.

According to the invention, of course, there is a possibility of providing the found possible configuration for the user if such an information would be regarded to be of any help. It is furthermore, according to the invention, possible of course to give an indication to the user if the one possible configuration has been found. The indication would give the user an idea of the running configuration being on the right path towards a valid configuration rather than heading towards a dead end.

The search for the above-mentioned possible configuration is carried out in a search tree, and the search tree will preferably be organized in such a way that the least constrained objects are nearest to the root, thereby minimizing the number of branches in the search tree. It should be noted that many other search techniques are possible, depending on for instance the structure of the objects or the chosen kind of propagation algorithm.

The result of the Minimal_Configuration_Check algorithm can thus be expressed as Assignment list: A=TRUE, B=TRUE, E=TRUE Found Possible Configuration: YES (A=B=D=E=TRUE, C=FALSE, X=1 and Y=3)

Unbound

The next algorithm in the cascade has also an increased time complexity. The algorithm is adapted to investigate whether further possible configurations can be found among the undetermined object values. Moreover, the aim of the algorithm is to check whether or not an object has unbound values and therefore is open for a user selection. In the preferred embodiment of the invention the search is carried out by taking the objects, one by one, altering the object value, searching for a further possible configuration formed by the altered value, the previously assigned object values and some of the undetermined object values. If a further possible configuration comprising the altered object value is found, the object is defined to be unbound, and the search will proceed by altering further objects.

The definition of an unbound object is thus an object having at least two object values, each being included in a possible configuration.

As an initial state the Unbound algorithm uses the possible configuration already found in the Minimal_Configuration_Check-algorithm, modify the object values of the object one by one, and propagate the altered set of object values, until it has been determined whether or not the objects can be comprised in a possible configuration with at least two object values.

Figures 9A, 9B:
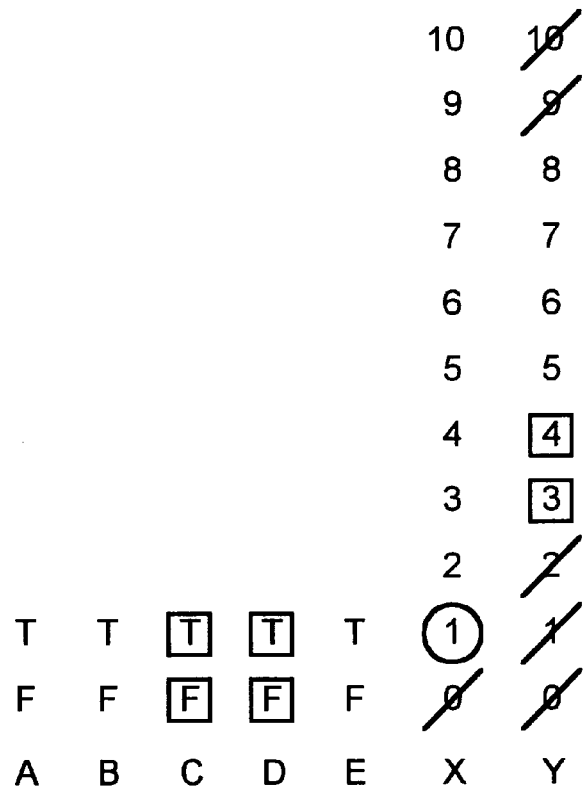

The result of the algorithm is illustrated in FIGS. 9a and 9b. The figures show that the algorithm leads to a higher level of knowledge in the sense that the object value of the object X is concluded to be 1 as no configuration comprising the value X=0 could be found.

The objects of C, D and Y are furthermore deduced to be Unbound, as it was possible to find possible configurations comprising C=D=TRUE/FALSE, Y=[3,4]

The Unbound algorithm thus prepares the input for the following even more time-consuming algorithm in the sense that only the objects determined to be unbound are to be investigated to obtain sufficient knowledge about the rest of the undetermined space of object values.

Even though it does not appear from the described embodiment, object values according to other examples or embodiments may still be at level 1.

It is to be noted that the objects C and D have now been sufficiently investigated, as all the values of these objects, i.e. TRUE or FALSE, have been propagated as a part of a valid possible configuration. These objects have now reached knowledge level 2, as it has been proved that these values are unbound and can be comprised in a configuration. Only Y thus has to be examined, as it is not yet determined whether or not Y=[5..8] can be comprised in a valid configuration. The highest level of knowledge is thus achieved regarding the objects C and D, as these values can now be selected with certainty as the next user assignment without conflicting with the rule base.

The result of the Unbound algorithm can thus be expressed as

Assignment list: A=TRUE , B=TRUE, E=TRUE , X=1
Unbound list: C, D, Y=[3, 4].

Sufficient_Configuration_Check

The final algorithm in the cascade is the Sufficient_Configuration_Check algorithm which is adapted to deduce the final necessary partial knowledge about the undetermined objects. This essential algorithm will ensure that clear information about unassigned object values can be presented to the user. The information points out whether the object values in question can be selected by further user assignments.

The goal of the Sufficient_Configuration_Check algorithm is thus to investigate whether the rest of the undetermined object values are comprised in a possible configuration. If some of these object values are not found to be comprised in any possible configuration, the object values, in terms of the invention, will have to be rejected. A rejected object value is excluded from the next possible user assignments or at least marked with an indication showing that the object value is not a valid next choice.

FIGS. 10a and 10b show the result of the algorithm. The Sufficient_Configuration_Check algorithm furthermore deduces that the object values of Y=[5..7] and Y=[9,10] are not comprised in valid configurations, and the object values are thus rejected.

The algorithm moreover deduces that value Y=[8] is comprised in a valid configuration. The knowledge, added to the knowledge gained in the latter algorithm, shows that Y=[3,4,8] are all possible object values. The values are thus found to be unbound in terms of the invention.

The result of the Sufficient_Configuration_Check algorithm can thus be expressed as Assignment list: A=TRUE , B=TRUE, E=TRUE , X=1
Unbound list: C, D, Y=[3, 4, 8]

All the object values have now reached the highest level of knowledge, i.e. level 2. This means that all the deduced information in the assignment list can be added to the partial configuration. Moreover the unbound object values above-listed are now deduced to be possible and valid next choice, and this information can be provided to the user. The user can now be certain that the following efforts to make a final configuration will succeed.

Figure 11:
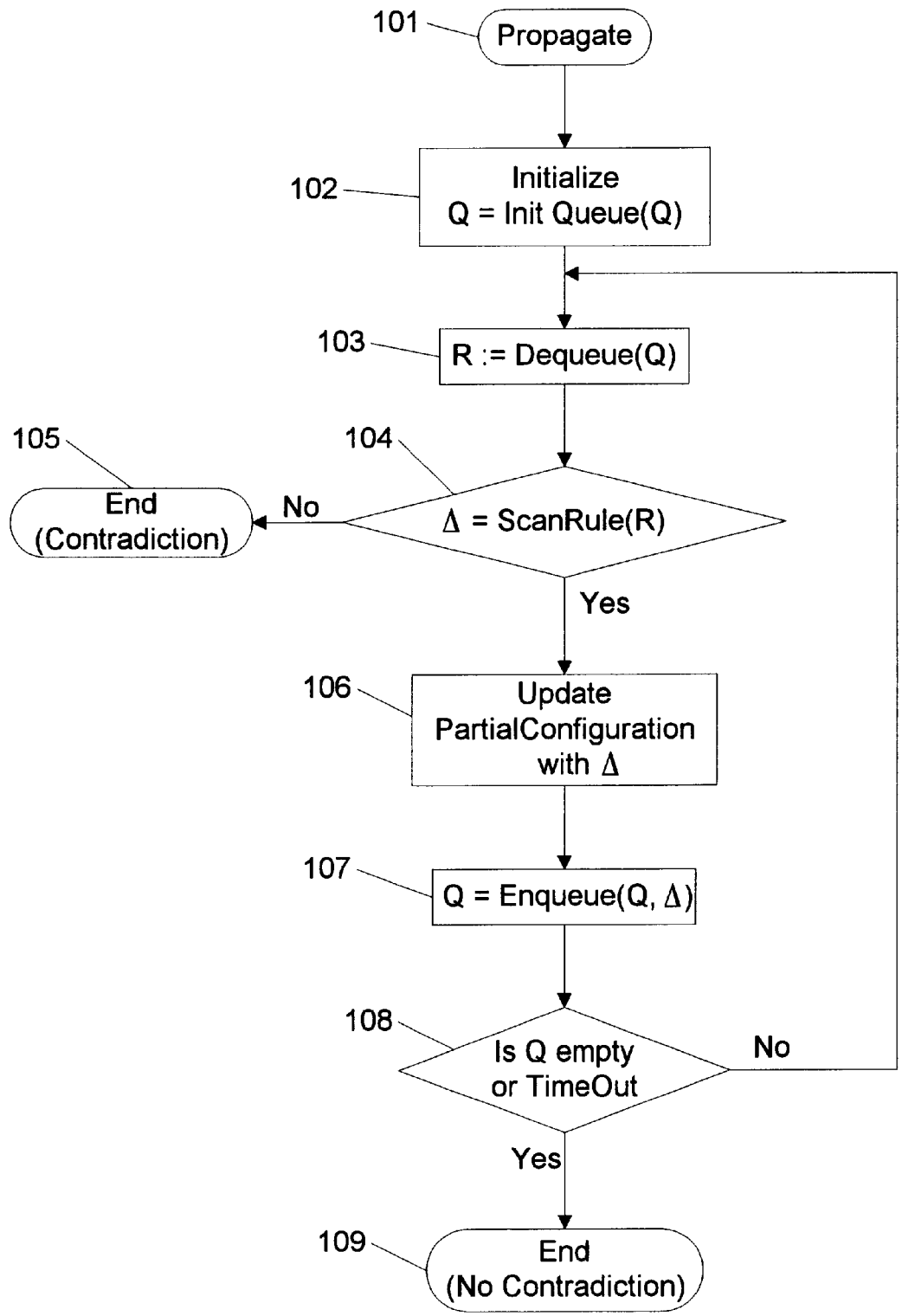
FIG. 11 illustrates the process flow of Propagate.

Referring now to FIG. 11 a propagation algorithm according to a preferred embodiment of the invention will be described by means of a flow chart showing the principal basic operations of the algorithm. The most preferred propagation algorithms are based upon the disclosure of the European Patent no. 0 456 675, but it should be noted that the necessary propagation algorithm can be implemented in numerous different ways within the scope of the invention.

The terms of the flow chart in FIG. 11 are defined by the following explanations.

A PartialConfiguration is the total set of object values and their associated knowledge, thus constituting a partial configuration in which all knowledge is collected, Q is a queue containing logical rules, R is a rule and $\Delta$ is a set of object values that have been deduced to be either concluded or rejected as a consequence of the assignments in the PartialConfiguration.

The propagation algorithm is initiated in step 101. In step 102 a PartialConfiguration is maintained from the calling algorithm. Rules from the rule base are put into queue Q, and the propagate algorithm proceeds to step 103. In step 103 a rule R is dequeued from the queue Q. In step 104, Scanrule (R), the propagate algorithm uses the algorithm described in a co-pending application 08/998,629 filed by the applicant the Dec. 29, 1997. The Scanrule(R) returns a set $\Delta$ of concluded and rejected object values not determined in the PartialConfiguration. It is to be noted that the set $\Delta$ may be empty if no information could be deduced by the scanning of the rule or rules. Scanrule will fail if the rule R is in contradiction with the PartialConfiguration. If Scanrule does not detect a contradiction the algorithm proceeds to step 106. If a conflict is detected, the propagation algorithm proceeds to step 105, and the propagation algorithm is terminated with a contradiction.

In step 106 the knowledge, if any, from $\Delta$ is assigned to PartialConfiguration, and the PartialConfiguration now comprises the original user assigned object values, said to be selected or discarded, and the knowledge deduced in step 104, said to be concluded or discarded. It is noted that the knowledge from $\Delta$ can be merged to PartialConfiguration as no contradictions were detected in step 104. The knowledge comprised in $\Delta$ thus only replaces object values of a lower knowledge level.

In the following step 107 all the rules from the rule base involving objects mentioned in $\Delta$ are added to Q.

In the following step 108 the queue Q is checked. If Q is empty or if a TimeOut has occurred, the algorithm terminates and proceeds to the end step 109 with no contradictions. If the queue is not empty, the process reiterates to step 103.

When the end step is reached, all the rules have been propagated, and some further knowledge about undetermined object values may have been obtained. The possible obtainable information depends on the way the rule base and the ScanRule(R) are implemented. If a rule base is defined by e.g. an IF-THEN based programming, it may probably be difficult to extract sufficient information, and according to the invention it is thus preferred to use a logic-based rule structure and scanning, as described in the European Patent no. 0 456 675.

Figure 12:
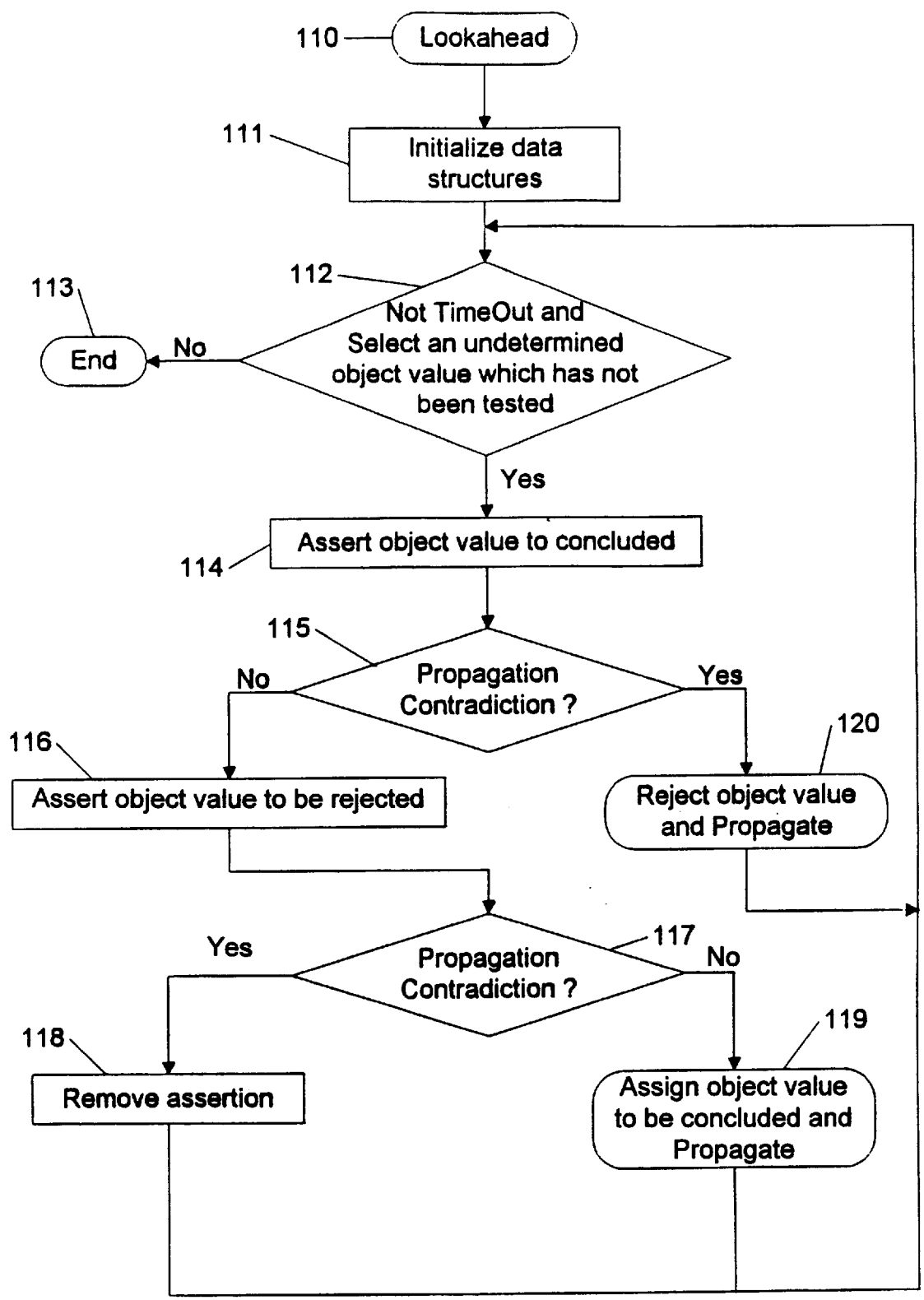
FIG. 12 illustrates the process flow of LookAhead.

Referring now to FIG. 12, the Unbound algorithm according to a preferred embodiment of the invention will be described. The flow chart shows the principal basic operations of the algorithm.

The terms of the flow chart in FIG. 12 are defined by the following explanations.

Tested is a list of object values. This list is used to keep track of which object values have been tested.

AssertedValue is an unknown object value temporarily assigned to be either concluded or rejected.

PartialConfiguration is the total set of object values and their associated knowledge, thus constituting the partial configuration in which all knowledge is collected.

The Unbound algorithm is initiated in step 110 and proceeds to step 111. In step 111 the list Tested is initially set to be the list of determined object values, and the AssertedValue is initially set to be VOID, i.e. non-existing. PartialConfiguration constitutes the choices and inferred values available when the algorithm is initialized. After the initializations listed above the algorithm proceeds to step 112.

In step 112 the algorithm finds an object value which is not in Tested. If such a value can be found, the algorithm proceeds to step 114. If no such value exists or if there has been a TimeOut, the algorithm is terminated in step 113.

In step 114 the selected object value found in step 112 is assigned to AssertedValue as concluded, i.e. TRUE, and the algorithm proceeds to step 115.

In step 115 the previously described Propagation algorithm is invoked with PartialConfiguration as an input object value set. The updated PartialConfiguration thus comprises the previously assigned object values and the AssertedValue. It the propagation of the PartialConfiguration does not result in a conflict with the rule base, the algorithm proceeds to step 116. As the Propagation succeeded for AssertedValue, the assignment of AssertedValue is now altered to be rejected, i.e. FALSE in the PartialConfiguration in the hope of reaching a contradiction, and the algorithm proceeds to step 117. In step 117 a further Propagation is invoked. It this propagation succeeds, it is thus deduced that the object value of the AssertedValue may be both TRUE or FALSE, and the algorithm proceeds to step 118. Alternatively, in step 119, the Propagation has now succeeded for the object value assigned to be concluded as well as rejected. In step 118 it cannot be concluded either for or against, the AssertedValue is set to VOID and the assertion is undone in the PartialConfiguration, and the algorithm proceeds to step 112.

If the result of the Propagation in step 115 was a conflict with the rule base, the algorithm proceeds to step 120 as propagation for AssertedValue assigned concluded in step 115 did not succeed, this object value is found to be rejected, i.e. FALSE, and the PartialConfiguration is updated in step 120. Furthermore the updated PartialConfiguration is Propagated, and the algorithm returns to step 112 for further test of undetermined object values which have not been tested yet.

Figure 13:
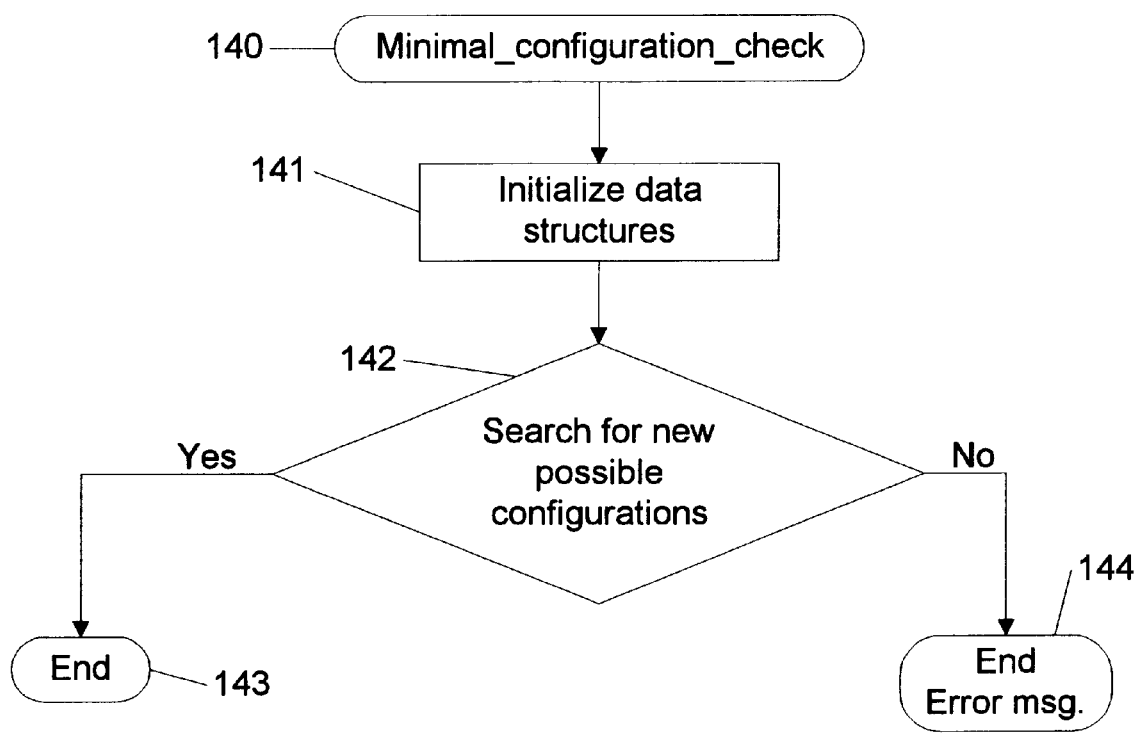
FIG. 13 illustrates the process flow of Minimal_Configuration_Check.

Referring now to FIG. 13, a Minimal_Configuration_Check algorithm according to a preferred embodiment of the invention will be descried by means of a flow chart showing the principal basic operations of the algorithm.

The terms of the flow chart in FIG. 13 are defined by the following explanations.

AssertedValue in this algorithm is an object value temporarily assigned concluded.

PartialConfiguration is the total set of object values associated with their knowledge, thus constituting the partial configuration in which all knowledge is collected.

The Minimal_Configuration_Check algorithm is initiated in step 140 and proceeds in step 141. In step 141 all the data structures are initialized. The AssertedValue is initialized to be VOID, and the PartialConfiguration is initialized to comprise the previously found or selected assigned object values delivered by the previously described algorithm LookAhead.

The algorithm proceeds in step 142 in which the undetermined object values are asserted to be concluded in AssertedValue and added to PartialConfiguration and propagated by the Propagation algorithm in a search for a final configuration satisfying the rule base. If the propagation of the PartialConfiguration results in a contradiction, the concluded object value is undone, and another object value is assigned to be concluded and propagated.

The algorithm is looped until a possible PartialConfiguration has been found or when no further undetermined object values can be asserted. If a possible configuration can be found, the algorithm proceeds in step 143 and the algorithm terminates.

If no possible configuration could be found, the algorithm proceeds to step 144 and the algorithm terminates. In step 144 error messages will be initiated.

Figure 14:
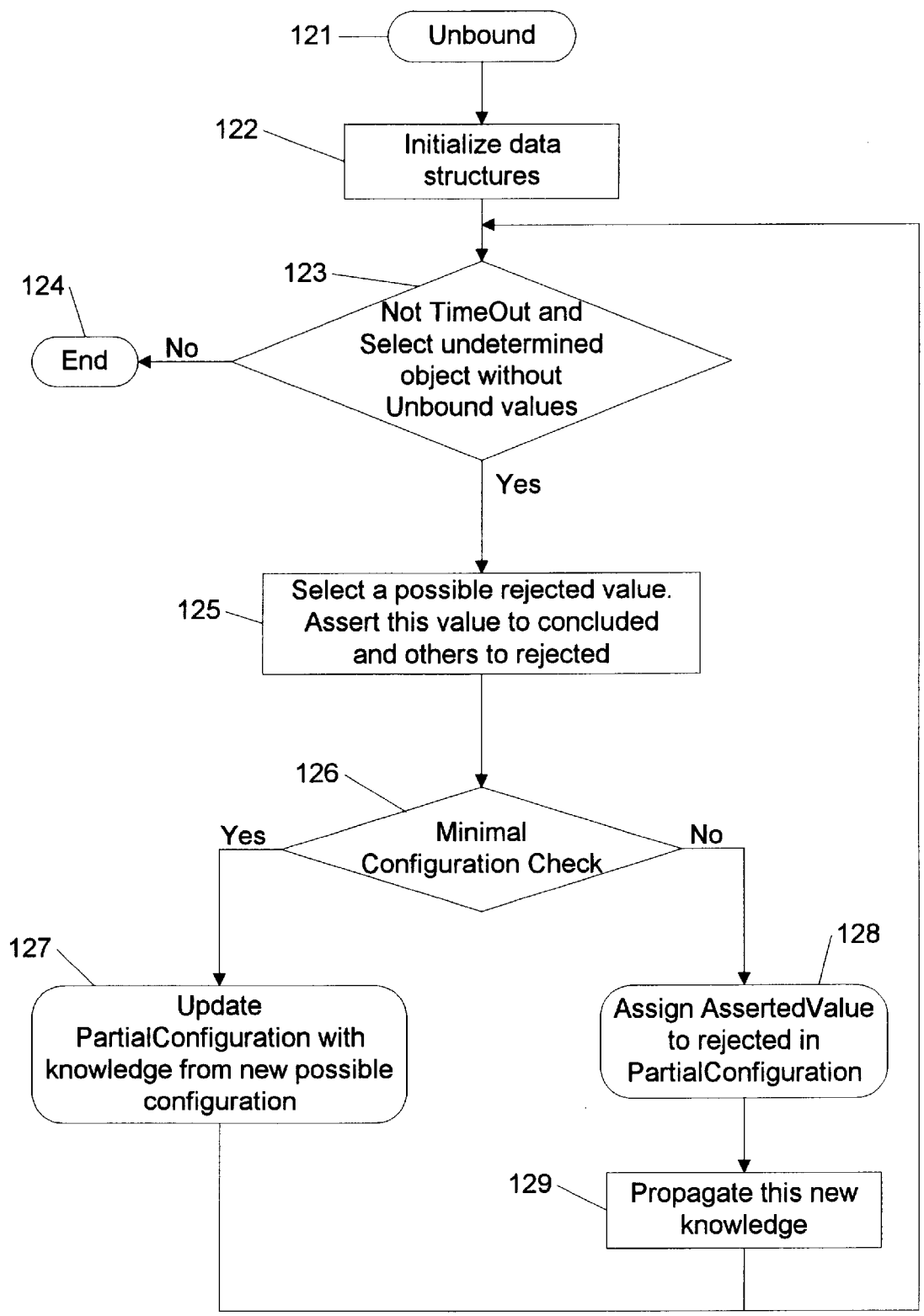
FIG. 14 illustrates the process flow of Unbound.

Referring now to FIG. 14, an Unbound algorithm according to a preferred embodiment of the invention will be described by means of a flow chart showing the principal basic operations of the algorithm.

The terms of the flow chart in FIG. 14 are defined by the following explanations.

The following definitions of knowledge level refers to knowledge levels illustrated in FIG. 16.

When Unbound algorithm commences, all values have been assigned knowledge values of 1 or 3, corresponding to possibly concluded, possibly rejected and concluded/rejected respectively.

It should be remembered that an undetermined object is an object with a value associated with a knowledge value at level 2 or less. Conversely, a determined object is an object with one value concluded/selected and all other values rejected/discarded, i.e. at level 3.

AssertedValue in this algorithm is an object value temporarily assigned concluded.

PartialConfiguration is the total set of object values and their associated knowledge, thus constituting the partial configuration in which all knowledge is collected.

The Unbound algorithm is initiated in step 121 and proceeds in step 122. In step 122 all the data structures are initialized. The AssertedValue is initialized to be VOID, PartialConfiguration is initialized to the possible configuration found in the previously described algorithm Minimal_Configuration_Check. The algorithm proceeds in step 123. In step 123 an undetermined object without an unbound object value is selected. The algorithm proceeds to step 124 and terminates if it is impossible to find an unbound object value. i.e. all objects having unbound values have been established. The algorithm also proceeds to step 124 from step 123 if there has been a TimeOut. Otherwise the algorithm proceeds to step 125.

In this step 125 it is certain that the object chosen has values associated with knowledge at level 1. Now a value is picked that has been possibly rejected, and it is asserted to be possibly concluded by assigning AssertedValue, and the algorithm proceeds to step 126.

In step 126 a search for a possible configuration with AssertedValue is established. If a such configuration is found, the PartialConfiguration is updated with the knowledge from the new possible configuration, and the algorithm proceeds in step 127.

At this point, i.e. in step 127, at least two possible configurations have been found. One with the AssertedValue as possibly rejected and one with the AssertedValue as possibly concluded. Other object values with opposite knowledge values may exist, i.e. possibly concluded versus possibly rejected, in the new possible configuration and the PartialConfiguration. Whenever this is the case, such object values are updated and set to be unbound. The knowledge deduced at this stage is thus that some altered objects could possibly be comprised in further possible configurations, and the said objects are set to be unbound. Instead of further investigation of these unbound objects, these objects are left for further investigation by the next algorithm, Sufficient_Configuration_Check, and the algorithm thus proceeds to step 123.

Other objects are investigated throughout the object values of the objects, but none of these altered object values are found to be comprised in a possible configuration.

If no configuration is found in step 126, the algorithm proceeds to step 128. As no configuration was found in step 126 with the AssertedValue, this value cannot be concluded, i.e. assigned in the PartialConfiguration. Hence, this value is rejected in the PartialConfiguration and the algorithm proceeds to step 129.

In step 129 new updated PartialConfiguration is propagated, and the algorithm returns to step 123.

The algorithm terminates because knowledge is strictly increased in each iteration of the algorithm, and hence after a number of iterations no further undetermined without unbound values exist.

Figure 15:
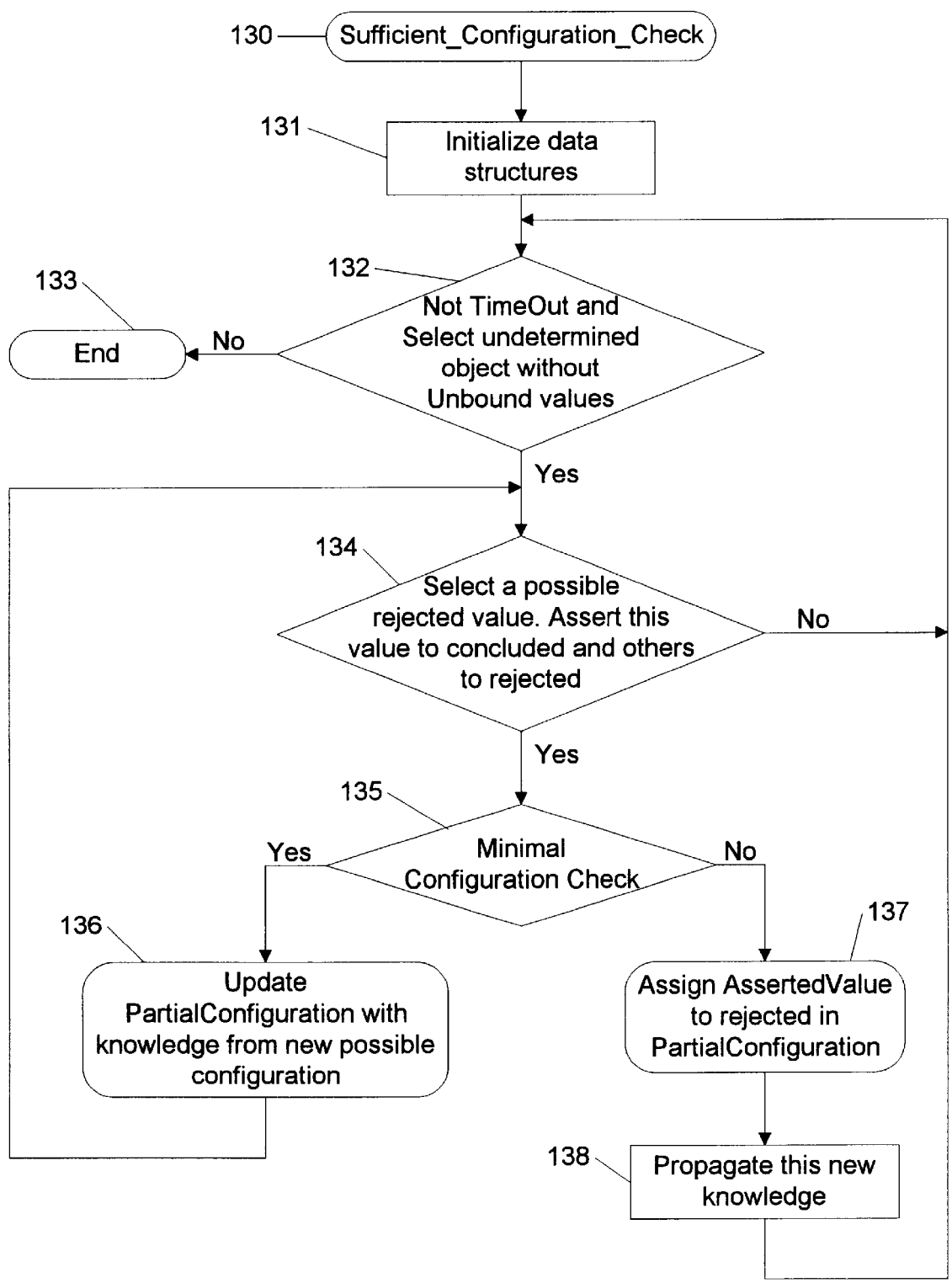
FIG. 15 illustrates the process flow of Sufficient_Configuration_Check.

Referring now to FIG. 15, a Sufficient_Configuration_Check algorithm according to a preferred embodiment of the invention will be described by means of a flow chart showing the principal basic operations of the algorithm.

The terms of the flow chart in FIG. 15 are defined by the following explanations.

AssertedValue is an object value temporarily assigned concluded in this algorithm.

PartialConfiguration is the total set of object values and their associated knowledge, thus constituting the partial configuration in which all knowledge is collected.

The Sufficient_Configuration_Check algorithm in initiated in step 130 and proceeds to step 131. In step 131 all the data structures are initialized. The AssertedValue is initialized to be VOID, i.e. non-existing, the PartialConfiguration is maintained from the previous algorithm Unbound, and the algorithm proceeds to step 132. In step 132 an unbound object from the set of objects is selected. If it is impossible to find an unbound object, the algorithm proceeds to step 133 and the algorithm terminates. Furthermore the algorithm proceeds to step 133 from step 132, if a TimeOut has been established. Otherwise the algorithm proceeds to step 134.

In step 134 a value that has been possibly rejected is picked and asserted to be possibly concluded by assigning AssertedValue. If all object values are either Unbound or Determined the algorithm proceeds to step 135, otherwise the algorithm reiterates from step 132.

In step 135 the algorithm searches for a possible configuration with AssertedValue. If such a one is found, the PartialConfiguration is updated with the knowledge from the new possible configuration, and the algorithm proceeds to step 136. Otherwise the algorithm proceeds to step 137.

In step 137 the Asserted value cannot be concluded, as no configuration was found with this AssertedValue. Hence, this value is rejected in the PartialConfiguration and the algorithm proceeds to step 138. In step 138 the new updated PartialConfiguration is propagated into the rule base, and the algorithm returns to step 132.

In step 136 at least two possible configurations have been found. One with the AssertedValue as possibly rejected and one with the AssertedValue as possibly concluded. Other object values with opposite knowledge values may exist (possibly concluded versus possibly rejected) in the new possible configuration and the PartialConfiguration. Whenever this is the case, such object values are updated to be unbound, and the algorithm reiterates from step 134.

Again, the algorithm terminates because knowledge is strictly increased in each iteration of the algorithm.

As the Sufficient_Configuration_Check algorithm is terminated, full knowledge about the objects and the object values is established. It is now possible to predict whether the next user choice is possible or not, as all the rejected object values can be marked or excluded from the user interface. All the other possible user choices may likewise be marked, said marking indicating that this object value is a valid next choice.

As at least one possible configuration for each next possible choice is found, i.e. unbound value, there is no risk of heading into a dead end in the next user choice. When the algorithm is finished, full or sufficient knowledge is established.

The force of this algorithm is thus that it deduces sufficient knowledge about the undetermined space of object values to ensure that the next possible user choices are valid and not heading into a dead end, whereas the Minimal_Configuration_Check algorithm is only capable of detecting whether a made choice has already entered a dead end.

It should be stressed that the invention is by no means limited to the described preferred embodiment. Moreover it should be noted that the aim of the introduced graduated terms of knowledge level is to illustrate the invention.

The invention may be embodied as a computer program or a part of a computer program, which may be loaded into the memory of a computer and executed therefrom. The computer program may be distributed by means of any data storage or data transmission medium. The storage media can be magnetic tape, optical disc, compact disc (CD or CD-ROM), mini-disc, hard disk, floppy disk, ferroelectric memory, electrically erasable programmable read only memory (EEPROM), flash memory, EPROM, read only memory (ROM), static random access memory (SRAM), dynamic random access memory (DRAM), ferromagnetic memory, optical storage, charge coupled devices, smart cards, etc. The transmission medium can be a network, e.g. a local area network (LAN), a wide area network (WAN), or any combination thereof, e.g. the Internet. The network may comprise wire and wire-less communication links. Via the network a software embodiment (i.e. a program) of the invention, or a part thereof, may be distributed by transferring a program via the network.

What is claimed is:

1. A computer-aided method of configuring a set of objects in a computer by enabling a user to assign determined object values to the objects having undetermined object values;

assignment of object values to the objects being constrained by a rule base defining which complete assignments of object values to the set of objects are valid and which are not;

the validity of the object values assigned to the set of objects being verified against the rule base by means of a configuration engine also being capable of inferring knowledge about the object values according to the rule base and the assignments made by the user, wherein, the computer-aided configuration method is organised as a cascade of interruptible algorithms which are ordered in an order of temporal complexity and degree of accuracy with which the mentioned algorithms approximate the set of valid object values, and which are run automatically one after another and which provide more knowledge about the undetermined object values the longer the cascade of interruptible algorithms are allowed to run.

2. A computer-aided method according to claim 1, wherein the knowledge about the object values is presented to the user via a user interface either at a request by the user or at a time-interrupt.

3. A computer-aided method according to claim 1, wherein the cascade of algorithms comprises a propagation algorithm adapted to verify whether the object values assigned to objects are valid according to the rule base.

4. A computer system, having means for executing a program, where the program when executed is to make the computer execute the method according to claim 3.

5. A computer readable medium, having a program recorded thereon, where the program when executed is to make the computer execute the method according to claim 3.

6. A computer-aided method according to claim 1, wherein the cascade of algorithms comprises an algorithm adapted to select objects having an undetermined object value and, for each selected object:
- to generate a temporary combination including the objects having determined object values and the selected object, wherein the selected object is temporarily assigned a determined object value;
- to verify whether the temporary combination is valid according to the rule base, and
- for selected objects, to provide knowledge to the user, indicating whether the objects were involved in a valid temporary combination.

7. A computer system, having means for executing a program, where the program when executed is to make the computer execute the method according to claim 6.

8. A computer readable medium, having a program recorded thereon, where the program when executed is to make the computer execute the method according to claim 6.

9. A computer-aided method according to claim 1, wherein the cascade of algorithms comprises an algorithm adapted to predict whether one configuration is possible, said algorithm comprising the steps of:
- selecting objects having undetermined object values;
- generating a temporary combination including the objects having determined objects and including the selected objects wherein the selected objects are assigned first determined object values;
- verifying whether the temporary combination is valid according to the rule base;
- repeating the steps of generating a temporary combination and verifying whether the temporary combination is valid with other determined object values if the temporary combination is not valid; and
- providing knowledge to the user indicating whether or not a valid temporary combination is found.

10. A computer-aided method according to claim 9, wherein the cascade of algorithms comprises an algorithm adapted to generate and verify at least first and second temporary combinations, the first temporary combination being generated by assigning a first determined object value to a given object and the second temporary combination being generated by assigning a second determined object value to the given object, and
wherein, if the first and second combinations both are valid according to the rule base, the computer-aided method further comprises providing knowledge to the user indicating that the given object is determined to be unbound.

11. A computer aided method according to claim 9, wherein the cascade of algorithms comprises an algorithm adapted to repeat the steps of temporarily assigning determined object values to the selected objects, generating a temporary combination including objects having determined object values, and verifying whether the temporary combination is valid according to the rule base for different temporary assignments to discover and provide the user with knowledge about valid and invalid configurations on request.

12. A computer-aided method according to claim 9, wherein the temporary combinations are randomised in such a way that the order of the temporarily assigned object values is random.

13. A computer-aided method according to claim 9, wherein a register of the temporarily assigned object values is modified when one or more temporarily assigned object values, assigned by a first algorithm in the cascade, are comprised in a combination of object values in such a way that an algorithm succeeding the first algorithm in the cascade can exclude that combination of object values from a space of combinations of object values.

14. A computer system, having means for executing a program, where the program when executed is to make the computer execute the method according to claim 9.

15. A computer readable medium, having a program recorded thereon, where the program when executed is to make the computer execute the method according to claim 9.

16. A computer-aided method according to claim 1, wherein knowledge is inferred in the form of object values.

17. A computer-aided method according to claim 1, wherein the object values comprise:
- a first object value meaning that an object is included in a configuration;
- a second object value meaning that an object is excluded from a configuration; and
- a third object value meaning that an object can be included as well as excluded.

18. A computer system, having means for executing a program, where the program when executed is to make the computer execute the method according to claim 1.

19. A computer readable medium, having a program recorded thereon, where the program when executed is to make the computer execute the method according to claim 1.

* * * * *